US012792953B2

(12) United States Patent
Yamada et al.

(10) Patent No.: US 12,792,953 B2
(45) Date of Patent: Nov. 10, 2026

(54) COMPUTER-READABLE RECORDING MEDIUM STORING MACHINE LEARNING PROGRAM, MACHINE LEARNING METHOD, AND ESTIMATION DEVICE

(71) Applicant: FUJITSU LIMITED, Kawasaki (JP)

(72) Inventors: Hiroaki Yamada, Kawasaki (JP); Masatoshi Ogawa, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 1375 days.

(21) Appl. No.: 17/542,423

(22) Filed: Dec. 5, 2021

(65) Prior Publication Data

US 2022/0277223 A1 Sep. 1, 2022

(30) Foreign Application Priority Data

Feb. 26, 2021 (JP) ................................ 2021-030320

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | | |
|---|---|---|---|---|
| 11,636,399 | B2 * | 4/2023 | Kajihara | G06N 7/00 706/12 |
| 12,204,823 | B1 * | 1/2025 | Capell | G05D 1/0221 |
| 2020/0028703 | A1 * | 1/2020 | Homsi | G05B 15/02 |
| 2021/0110552 | A1 * | 4/2021 | Bhat | G06T 11/60 |
| 2022/0051139 | A1 * | 2/2022 | Tullberg | H04L 69/04 |

OTHER PUBLICATIONS

G.-G. Lee, B.-s. Kim and W.-Y. Kim, "Automatic Estimation of Pedestrian Flow," 2007 First ACM/IEEE International Conference on Distributed Smart Cameras, Vienna, Austria, 2007, pp. 291-296, doi: 10.1109/ICDSC.2007.4357536. (Year: 2007).*
NPL Feng Intelligent driving intelligence test for AVs Feb. 2, 2021.*
NPL Greer Trajectory Prediction in Autonomous Driving 2021.*
NPL Guo An introduction to surrogate modeling Part I 2020.*

(Continued)

*Primary Examiner* — Paul M Knight
(74) *Attorney, Agent, or Firm* — Fujitsu Intellectual Property Center

(57) ABSTRACT

A non-transitory computer-readable recording medium stores a machine learning program for causing a computer to execute processing including: acquiring a first parameter that represents an environment and a second parameter that represents a movement attribute of each of a plurality of moving bodies in the environment; classifying the plurality of moving bodies into a plurality of groups on the basis of the second parameter; generating a third parameter that indicates the number of moving bodies classified into each of the plurality of groups; and inputting the first parameter and the third parameter to a machine learning model to generate estimation information regarding movement of the plurality of moving bodies in the environment.

7 Claims, 11 Drawing Sheets

(56) References Cited

OTHER PUBLICATIONS

NPL Ismail Automated Analysis of Pedestrian Vehicle Conflicts 2010.*
NPL Le EUSC A Clustering Based Surrogate Model 2020.*
NPL Lee Clustered Multi Task Seq2Seq Learning for AV Repositioning Jan. 2021.*
NPL Liu Semi supervised Crowd Counting 2020.*
NPL Mittal Just Go with the Flow 2020.*
NPL Sun A review of the ANN Surrogate Modeling 2019.*
Hiroaki Yamada et al., “Modeling and Managing Airport Passenger Flow Under Uncertainty: A Case of Fukuoka Airport in Japan”, Social Informatics—9th International Conference, Springer International Publishing AG 2017, Socinfo 2017, Part 2, LNCS(Lecture Notes in Computer Science) Springer Verlag, vol. 10540, pp. 419-430, Sep. 2017 (Total 12 pages).
Zahra Karevan et al., “Transductive LSTM for Time-series Prediction: An application to Weather Forecasting”, Elsevier, Neural Networks: the Official Journal of the International Neural Network Society, vol. 125, pp. 1-9, Jan. 8, 2020 (Total 9 pages).

* cited by examiner

FIG. 5

150

| SEGMENT #1 | SEGMENT #2 |
| --- | --- |
| 2 | 1 |

COMPUTER-READABLE RECORDING MEDIUM STORING MACHINE LEARNING PROGRAM, MACHINE LEARNING METHOD, AND ESTIMATION DEVICE

CROSS-REFERENCE TO RELATED APPLICATION

This application is based upon and claims the benefit of priority of the prior Japanese Patent Application No. 2021-30320, filed on Feb. 26, 2021, the entire contents of which are incorporated herein by reference.

FIELD

The embodiments discussed herein are related to a machine learning program, a machine learning method, and an estimation device.

BACKGROUND

In recent years, population concentration in cities has caused various social problems such as chronic congestion, noise, and air pollution. Therefore, optimization of social systems such as transportation systems is an important issue in each city.

Yamada, H., Ohori, K., Iwao, T., Kira, A., Kamiyama., Yoshida, H., & Anai, H., "*Modeling and managing airport passenger flow under uncertainty: A case of fukuokaairport in Japan*", Social Informatics—9th International Conference, SocInfo2017, Proceedings, pp. 419-430, Vol. 10540, *Lecture Notes in Computer Science*, Springer Verlag, 2017; and Karevan, Z., Suykens, J A K., "Transductive LSTM for time-series prediction: An application to weather forecasting", Neural Networks: the Official Journal of the International Neural Network Society, Vol. 125, pp. 1-9, 8 Jan. 2020 are disclosed as related art.

SUMMARY

According to an aspect of the embodiments, a non-transitory computer-readable recording medium stores a machine learning program for causing a computer to execute processing including: acquiring a first parameter that represents an environment and a second parameter that represents a movement attribute of each of a plurality of moving bodies in the environment; classifying the plurality of moving bodies into a plurality of groups on the basis of the second parameter; generating a third parameter that indicates the number of moving bodies classified into each of the plurality of groups; and inputting the first parameter and the third parameter to a machine learning model to generate estimation information regarding movement of the plurality of moving bodies in the environment.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of segment parameter information;

DESCRIPTION OF EMBODIMENTS

Figure 1:
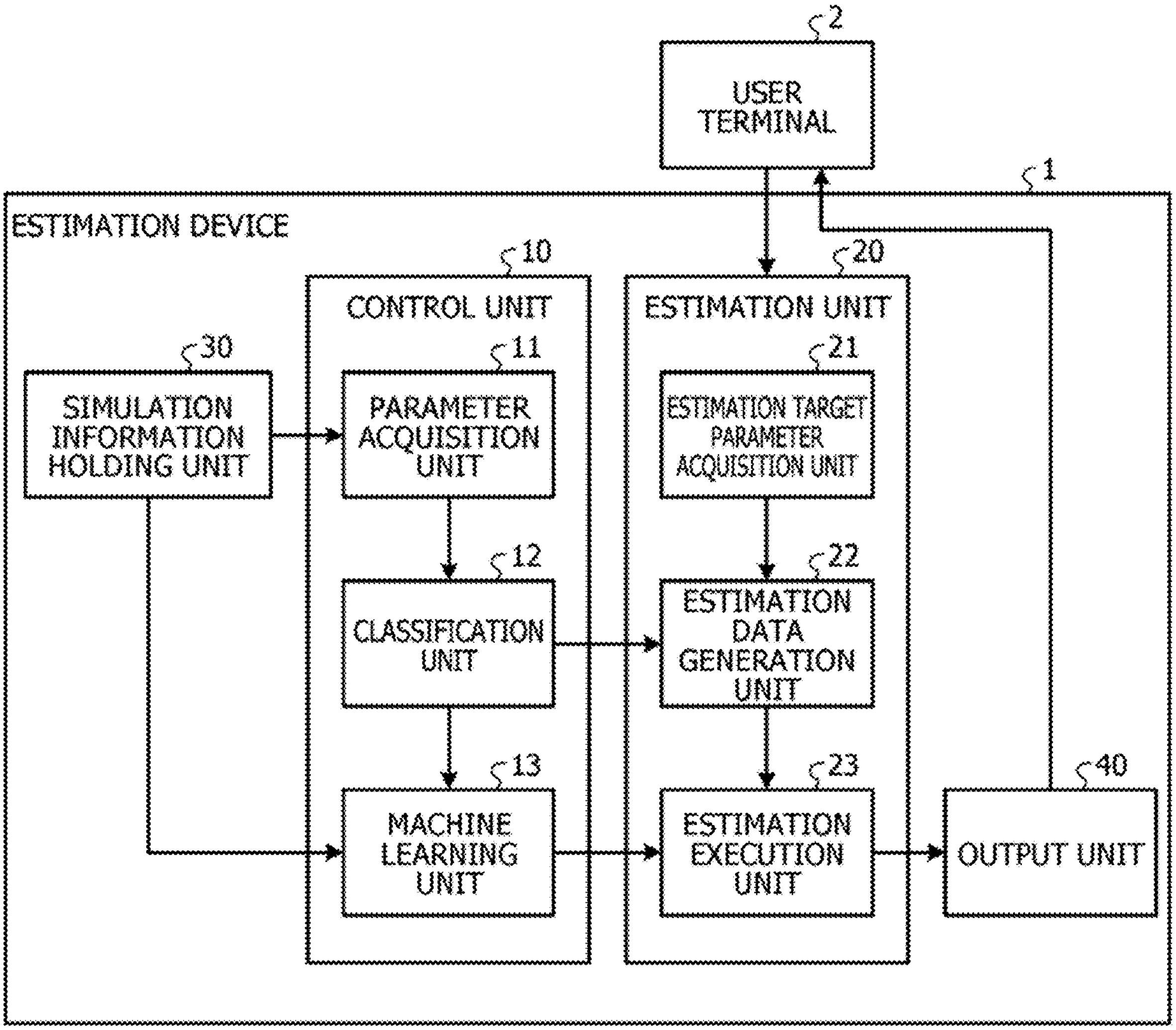
FIG. 1 is a block diagram of an estimation device according to an embodiment.

For example, movement of people in a city creates people flow and traffic flow. Therefore, for the safety and security of people in the city, it is desirable to manage the people flow and traffic flow so that congestion does not occur. As a method of managing the people flow and traffic flow, there are methods such as city planning, improvement of transportation network, and guidance by signals and incentives.

To effectively manage the people flow and traffic flow, it is important to predict a situation of occurrence of congestion and an effect of congestion mitigation measures. Therefore, attention has been being paid to design of social systems by simulating the people flow and traffic flow. For example, the management can be made more efficient by evaluating each method of managing the people flow and traffic flow by simulating the people flow and traffic flow, and feeding back an evaluation result. Furthermore, simulation also has an advantage of lower cost than conducting a social experiment.

There is a method called agent simulation as a method of simulating the people flow and traffic flow. An agent represents an entity that independently makes a decision, and simulation performed in units of actions of those agents is agent simulation.

However, when trying to find an optimum measure by simulation, execution of the simulation is repeated many times, which needs large calculation cost. Therefore, a technology for substituting simulation by deep learning technology has been proposed. For example, there is a method called surrogate model method of learning various relationships between situations of cities and congestion obtained by simulation, and predicting congestion of an unknown situation at high speed, using a trained model. By substituting simulation by the deep learning technology, it is possible to reduce a use rate of a central processing unit (CPU) and time, and it is possible to seek optimum measures at low cost.

As the machine learning method for the relationship between a situation of a city and congestion, a method of learning input/output of a system using a normal machine learning method for time-series data is conceivable. For example, learning can be performed using each parameter used in simulation as a feature amount of a recurrent neural network such as long-short term model (LSTM) and using a correct answer label as a congestion situation at each time.

However, in the case of substituting the simulation by deep learning, if each parameter used in the simulation is used as it is, the number of parameters used in the simulation becomes enormous, and an input sequence becomes long. If the input sequence becomes long, the amount of calculation increases remarkably, and there is a risk that machine learning will not proceed.

The disclosed technology has been made in view of the above, and an object is to provide a machine learning program, a machine learning method, and an estimation device that efficiently estimate the people flow and traffic flow.

Hereinafter, embodiments of a machine learning program, a machine learning method, and an estimation device disclosed in the present application will be described in detail with reference to the drawings. Note that the following embodiments do not limit the machine learning program, the machine learning method, and the estimation device disclosed in the present application.

EMBODIMENT

FIG. 1 is a block diagram of an estimation device according to an embodiment. An estimation device 1 according to the present embodiment performs training using execution results of a plurality of agent simulations and information of parameters used in those agent simulations as training data, and constructs a surrogate model of the agent simulations. Then, the estimation device 1 estimates people flow from information of parameters in a state of an estimation target, using the constructed surrogate model. In the present embodiment, a time change in congestion is estimated as the estimation of the people flow. The following description will be given using the estimation of the people flow in a city as an estimation target will be described as an example. As illustrated in FIG. 1, the estimation device 1 includes a control unit 10, an estimation unit 20, a simulation information holding unit 30, and an output unit 40.

The simulation information holding unit 30 stores the execution results of the plurality of executed agent simulations and values of the parameters in each agent simulation. The parameters in the agent simulation are information representing a city situation, and include infrastructures and mobility needs of the city. Hereinafter, the parameters used when executing the agent simulation will be referred to as "simulation parameters". The simulation parameters are represented by numerical values of the following information.

Parameters representing the infrastructures of the city are called environmental parameters. The environmental parameters are, for example, information of properties of nodes in a simulation target and a network connecting the nodes. The nodes in the city are various facilities such as stores and open spaces, for example. The property of the node is, for example, a processing speed of a store. Then, the network represents a road or the like, and is, for example, information indicating how the stores are connected to each other. This environmental parameter is an example of a "first parameter".

Furthermore, the parameters representing the mobility needs are called agent parameters, and are information given to each agent who is an entity that independently makes a decision. The agent parameters are information related to movement of each agent, such as information as to what kind of route each agent uses, information as to when to arrive, and information as to when to give up arrival, for example. This agent parameter is an example of a "second parameter".

Figure 2:
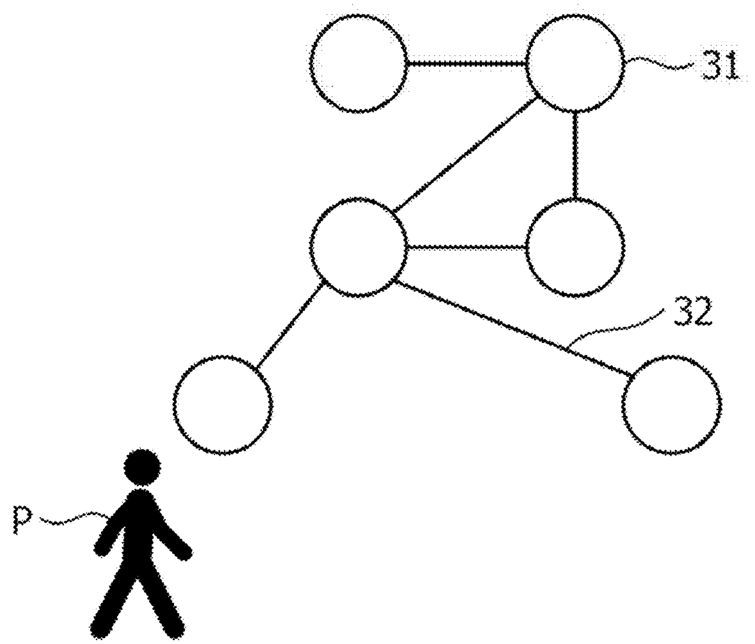
FIG. 2 is a diagram illustrating an example of an agent simulation target.

FIG. 2 is a diagram illustrating an example of an agent simulation target. For example, FIG. 2 illustrates a city situation in which a plurality of nodes 31 is connected with one another by a road 32. This city situation corresponds to an environment for learning. Then, an agent P moves in the city having the nodes 31 and the road 32. There are many agents P, each of which is a different target. Then, by performing the agent simulation, movement of each agent P in the city is calculated, and the congestion situation at each node 31 and the road 32 for each time is obtained.

The control unit 10 trains an Attention model, which is a type of recurrent neural networks (RNN), using information stored in the simulation information holding unit 30. The Attention model is a model that calculates a weight from an input vector and outputs an arbitrary vector from index vectors on the basis of the weight. In training, the control unit 10 uses a parameter summarizing the simulation parameters as training data. Details of the control unit 10 will be described below. Hereinafter, the summarized simulation parameter will be referred to as a "simulation summary parameter". As illustrated in FIG. 1, the control unit 10 includes a parameter acquisition unit 11, a classification unit 12, and a machine learning unit 13.

Figure 3:
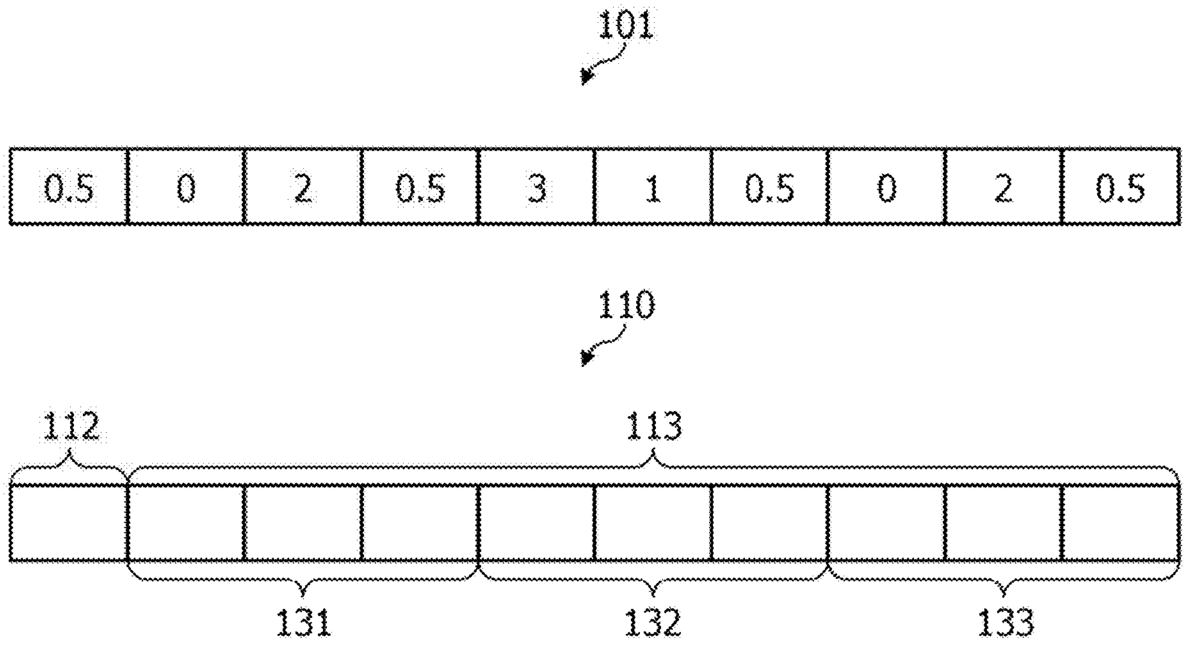
FIG. 3 is a diagram illustrating a storage state of parameter information.

The parameter acquisition unit 11 acquires the values of the simulation parameters used in the executed agent simulation from the simulation information holding unit 30. FIG. 3 is a diagram illustrating a storage state of the information of the parameters. The parameter acquisition unit 11 acquires the simulation parameter 101 illustrated in FIG. 3. The values of the parameters are stored in the simulation parameter 101.

The parameter acquisition unit 11 has model knowledge 110 indicating in what configuration the parameter values are stored in the acquired simulation parameter 101. For example, the parameter acquisition unit 11 has the model knowledge 110 in which the value of the environmental parameter is stored in a head region 112 of the parameter 101 and the values of the agent parameters are stored in the other region 113. Moreover, the model knowledge 110 includes information that the region 113 has regions 131 to 133 each containing three parameters. Then, the information of a different agent being stored in each of the regions 131 to 133 is indicated as the model knowledge 110. Here, for the sake of clarity, a case where the simulation parameter 101 has one environmental parameter and three pieces of agent parameter information each piece including information of three parameters, is explained as an example. However, there are no particular restrictions on these numbers. There may be a plurality of environmental parameters, and there may be a larger number of agent parameters.

The parameter acquisition unit 11 acquires the values of the agent parameters for each agent from the acquired simulation parameter 101 according to the model knowledge 110. For example, the parameter acquisition unit 11 acquires the values of three agent parameters of the first agent from the region 131 of the simulation parameter 101. Furthermore, the parameter acquisition unit 11 acquires the information of three agent parameters of the second agent from the region 132. Furthermore, the parameter acquisition unit 11 acquires the values of the agent parameters of the third agent from the region 131. Then, the parameter acquisition unit 11 outputs the values of the agent parameters for each agent in the each executed agent simulation to the classification unit 12.

The classification unit 12 receives input of the values of the agent parameters for each agent in the executed agent simulation from the parameter acquisition unit 11. Next, the classification unit 12 segments the agents on the basis of similarity from the values of the agent parameters. For example, the classification unit 12 executes the segmentation of the agents by clustering the information of the parameters of the agents using K-means.

Figure 4:
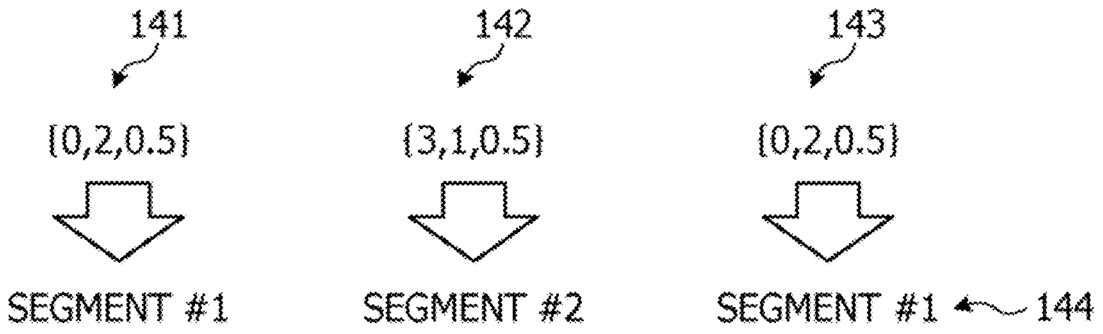
FIG. 4 is a diagram for describing segmentation of agents.

FIG. 4 is a diagram for describing segmentation of agents. For example, in the case of using the simulation parameter 101 of FIG. 3, the classification unit 12 acquires parameter values 141 to 143 including three parameter values as illustrated in FIG. 4 as the values of the agent parameters. In this case, the classification unit 12 classifies the agent having the parameter value 141 and the agent having the parameter value 143 into the same cluster according to the similarity of the parameter values. Furthermore, the classification unit 12 classifies the agent having the parameter value 142 into a cluster different from the agent having the parameter value 141 and the agent having the parameter value 143.

Next, the classification unit 12 labels each cluster generated by clustering as one segment. For example, as illustrated in labeling 144, the classification unit 12 sets the cluster including the agents corresponding to the parameter value 141 and the parameter value 143 as segment #1, and the cluster including the agent corresponding to the parameter value 142 as segment #2.

Then, the classification unit 12 aggregates the number of agents belonging to each segment. Then, the classification unit 12 uses an aggregation result for each segment as the value of each segment parameter. FIG. 5 is a diagram illustrating an example of segment parameter information. For example, in the case of performing labeling as illustrated in FIG. 4, the classification unit 12 sets the value of segment #1 to 2 and the value of segment #2 to 1, as illustrated in Table 150.

As a result, the classification unit 12 can summarize the agent parameters as the segment parameter. For example, the classification unit 12 can summarize the nine agent parameters contained in the simulation parameter 101 in FIG. 3 into the two segment parameters as illustrated in Table 150 in FIG. 5. Here, a segment is a collection of similar agents, and the meaning of the segment can be easily grasped. More specifically, it can be said that a center point of the agents included in each segment represents the meaning of that segment.

This segment parameter corresponds to an example of a "third parameter". Then, the classification unit 12 classifies the agents, which are a plurality of moving bodies, into a plurality of groups on the basis of the agent parameters, which are the second parameters. Then, the classification unit 12 generates the segment parameter that is the third parameter representing the number of agents that are moving bodies classified into each of the plurality of groups.

Thereafter, the classification unit 12 combines information of each generated segment parameter with the environmental parameter for each executed agent simulation to generate the simulation summary parameter. Thereafter, the classification unit 12 outputs a value of the generated simulation summary parameter to the machine learning unit 13 as training data. In this case, since the value of the simulation summary parameter including the value of the parameter of each segment becomes the training data to be input to the Attention model, it can be said that the classification unit 12 has reduced the training data by summarizing the simulation parameters.

Returning to FIG. 1, the description will be continued. The machine learning unit 13 receives input of the training data including the information of the simulation summary parameters for each executed agent simulation from the classification unit 12. Next, the machine learning unit 13 acquires the execution result of each executed agent simulation from the simulation information holding unit 30. Then, the machine learning unit 13 inputs the acquired training data into the Attention model to obtain a prediction value of the congestion situation at each time. Then, the machine learning unit 13 causes the Attention model to learn the relationship between the simulation summary parameter and the time change in congestion by training the Attention model using the execution result of the executed agent simulation as a correct answer label of the congestion situation at each time. Thereafter, the machine learning unit 13 outputs the trained Attention model to the estimation execution unit 16 of the estimation unit 20. This Attention model corresponds to an example of a "machine learning model". Then, the prediction value of the congestion situation at each time in the city corresponds to "estimation information regarding movement in the environment of a plurality of moving bodies".

Figure 6:
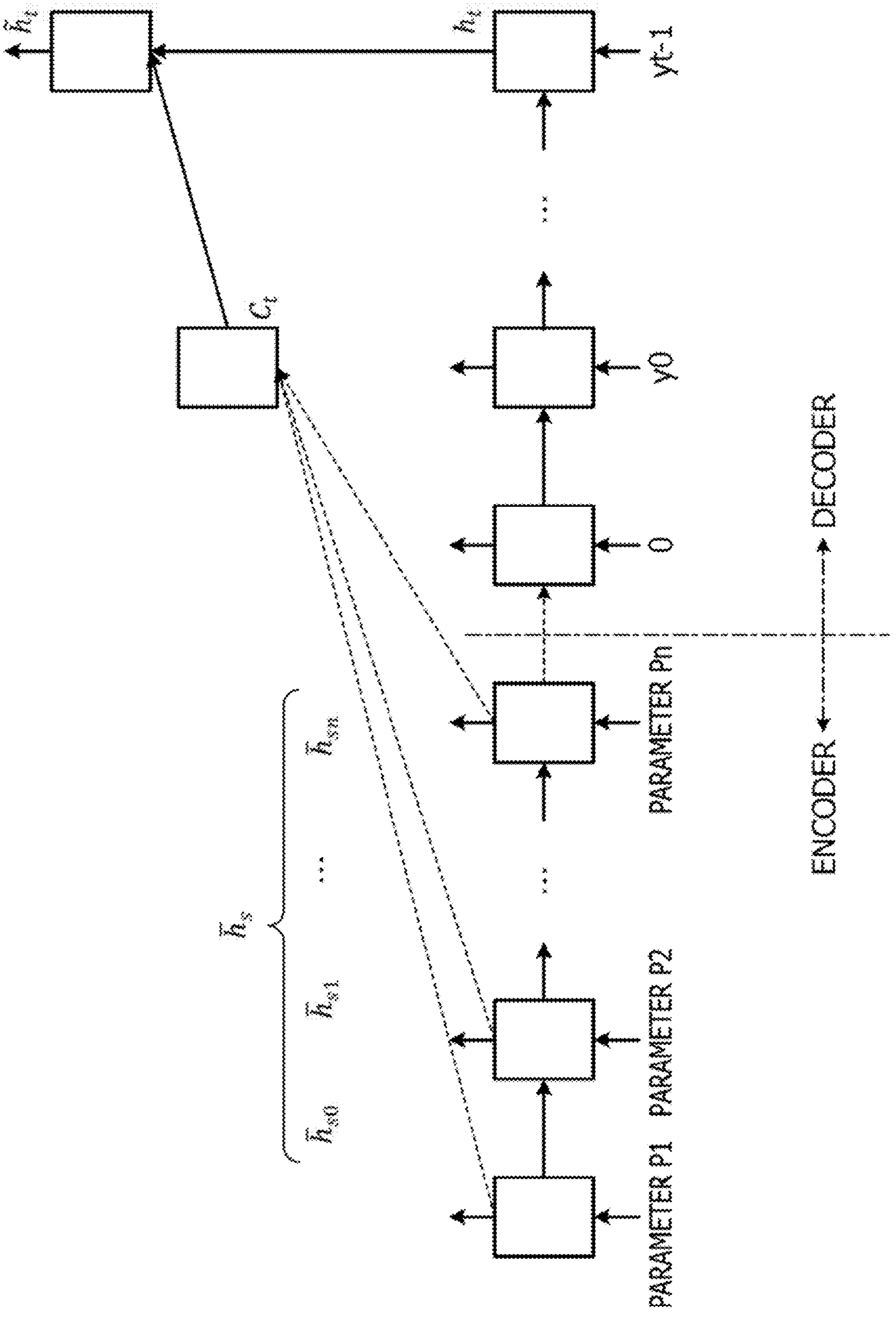
FIG. 6 is a diagram for describing an outline of machine learning by an Attention model.

FIG. 6 is a diagram for describing an outline of machine learning by the Attention model. Here, an outline of machine learning using the Attention model by the machine learning unit 13 will be described with reference to FIG. 6.

The Attention model according to the present embodiment has an encoder and a decoder. The machine learning unit 13 inputs parameters P1 to Pn, which are information of the parameters, to the Attention model in order in the encoder. Here, the machine learning unit 13 repeatedly inputs the next parameter to the Attention model to which the previous parameter has been input to acquire a next internal state. The machine learning unit 13 acquires internal states h-s0 to h-sn when inputting the parameters P1 to Pn by the encoder. On the decoder side, the machine learning unit 13 uses output data when inputting the last parameter Pn on the encoder side, as input data for the first input at time 0. Thereafter, the machine learning unit 13 uses the output data of the previous time as the input data of the next time.

Then, the machine learning unit 13 calculates an internal product of the internal state $h_t$ of the decoder at time t and each internal state of the encoder output when each of the parameters P1 to Pn is input in the encoder, and obtains a score of the similarity. In FIG. 6, each internal state is represented by a symbol with a bar at the top of each of $h_{s0}$ to $h_{sn}$. Next, the machine learning unit 13 takes softmax for each score and calculates $a_t(s0)$, which is an attention weight, using the following mathematical formula (1).

[Math 1]

$$a_t(s0) = \frac{\exp(h_t \cdot \overline{h}_{s0})}{\sum_{s \in S} \exp(h_t \cdot \overline{h}_s)} \tag{1}$$

Next, the machine learning unit 13 sum the internal states of the encoder weighted by the attention weight expressed as $a_t(s0)$ to create a context vector, using the following mathematical formula (2). ct is the context vector for the internal state at the time t.

[Math 2]

$$c_t = \sum_{s \in S} a_t(s)\bar{h}_s \tag{2}$$

$\bar{h}_s$

Next, the machine learning unit 13 predicts the time t, using a vector (represented by a symbol with a bar at the top of $h_t$ in FIG. 6) in which ht that is the output of the decoder and Ct that is the context vector are concatenated. Then, the machine learning unit 13 adjusts the parameters of the Attention model so as to minimize a difference between a prediction result of the time t and the execution result of the simulation.

Here, in the present embodiment, the machine learning unit 13 performs machine learning using the Attention model, but can use another RNN. For example, the machine learning unit 13 may use LSTM or sequence-to-sequence as the machine learning model.

The estimation unit 20 predicts the time change in congestion in the estimation target, using the trained Attention model, on the basis of the values of the simulation parameters in an initial state when executing the simulation in the city as the estimation target. This city as the estimation target is an example of a “second environment”. Details of the estimation unit 20 will be described below. As illustrated in FIG. 1, the estimation unit 20 includes an estimation target parameter acquisition unit 21, an estimation data generation unit 22, and an estimation execution unit 23. Hereinafter, the values of the simulation parameters in the initial state when executing the simulation in the city as the estimation target are referred to as the values of the simulation parameters in the estimation target.

The estimation target parameter acquisition unit 21 receives input of the values of the simulation parameters in the estimation target from a user terminal 2. Next, the estimation target parameter acquisition unit 21 extracts the values of the agent parameters from the values of the simulation parameters acquired by using the model knowledge. Thereafter, the estimation target parameter acquisition unit 21 outputs the extracted values of the agent parameters to the estimation data generation unit 22. This agent in the estimation target is an example of a “plurality of second moving bodies”. Furthermore, this agent parameter in the estimation target is an example of a “fifth parameter”.

The estimation data generation unit 22 receives input of the values of the agent parameters included in the simulation parameters in the estimation target from the estimation target parameter acquisition unit 21. Next, the estimation data generation unit 22 acquires the values of the agent parameters for each agent belonging to each cluster generated by the classification unit 12. Then, the estimation data generation unit 22 calculates the center point of each cluster using the acquired values of the agent parameters.

Next, the estimation data generation unit 22 calculates the distance between each agent and the center point of each cluster using the values of the agent parameters of each agent. Next, the estimation data generation unit 22 assigns the agents to the cluster at the closest distance. Next, the estimation data generation unit 22 aggregates the agents for each segment corresponding to each cluster. Then, the estimation data generation unit 22 summarizes the agent parameters included in the simulation parameters in the estimation target as the segment parameter by replacing the agent parameters with the segment parameter. This segment parameter in the estimation target is an example of a “sixth parameter”. Next, the estimation data generation unit 22 combines the value of the segment parameter with the value of the environmental parameter to generate estimation data. This environmental parameter in the estimation target is an example of the “sixth parameter”. Thereafter, the estimation data generation unit 22 outputs the generated estimation data to the estimation execution unit 23.

The estimation execution unit 23 acquires the trained Attention model from the machine learning unit 13 of the control unit 10 as the surrogate model of the agent simulation. Next, the estimation execution unit 23 receives input of the estimation data including the agent parameters summarized as the segment parameter from the estimation data generation unit 22. Then, the estimation execution unit 23 inputs the estimation data into the trained Attention model, acquires the estimation result of the time change in congestion, and predicts the time change in congestion in the estimation target.

The output unit 40 acquires the prediction result of the time change in congestion in the estimation target from the estimation execution unit 23 of the estimation unit 20. Then, the output unit 40 transmits the prediction result of the time change in congestion in the estimation target to the user terminal 2.

Figure 7:
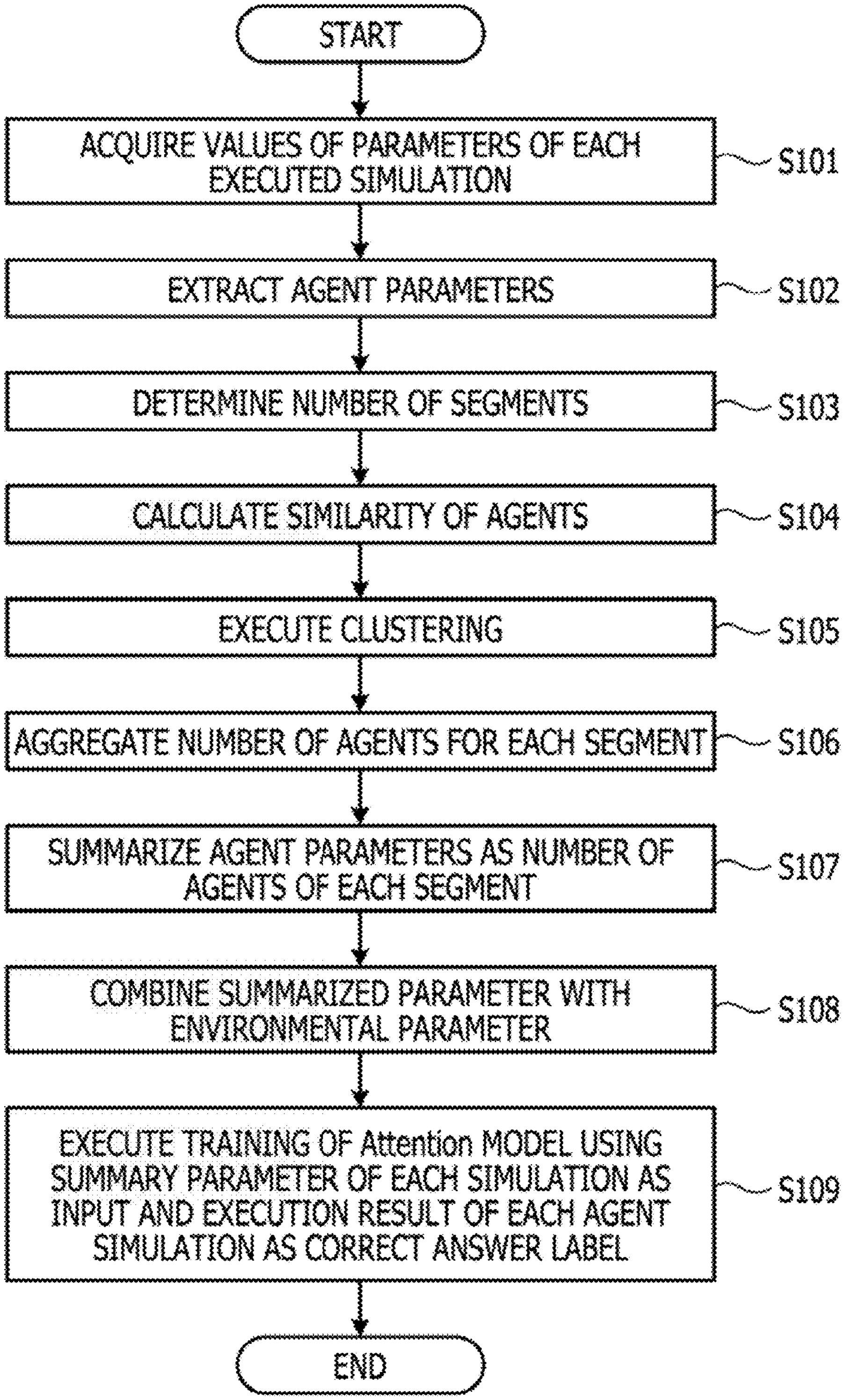
FIG. 7 is a flowchart of training processing for a surrogate model of agent simulation by the estimation device according to the embodiment.

FIG. 7 is a flowchart of training processing for the surrogate model of the agent simulation by the estimation device according to the embodiment. Next, a flow of the training processing for the surrogate model of the simulation by the estimation device 1 according to the embodiment will be described with reference to FIG. 7.

The parameter acquisition unit 11 acquires the values of the agent parameters of each executed agent simulation from the simulation information holding unit 30 (step S101).

Next, the parameter acquisition unit 11 extracts the agent parameters from the acquired simulation parameters, using the model knowledge (step S102).

The classification unit 12 determines the number of segments in response to, for example, designation from the user (step S103).

Next, the classification unit 12 acquires the values of the agent parameters in each executed agent simulation from the parameter acquisition unit 11. Then, the classification unit 12 calculates the similarity of the agents using the values of the agent parameters (step S104).

Next, the classification unit 12 executes agent clustering using the obtained similarity (step S105).

Next, the classification unit 12 labels each cluster to represent a segment and executes agent segmentation. Then, the classification unit 12 aggregates the number of agents for each segment (step S106).

Next, the classification unit 12 summarizes the agent parameters as the segment parameter having the number of agents belonging to each segment as the value (step S107).

Next, the classification unit 12 combines the parameter summarizing the agent parameters with the environmental parameter to generate information of the agent summary parameter in each agent simulation (step S108).

The machine learning unit 13 acquires the information of the summary parameter of each simulation. Furthermore, the machine learning unit 13 acquires the execution result of each executed agent simulation from the simulation information holding unit 30. Then, the machine learning unit 13 executes the training of the Attention model, using the summary parameter of each simulation as input and the execution result of each agent simulation as the correct answer label (step S109).

Figure 8:
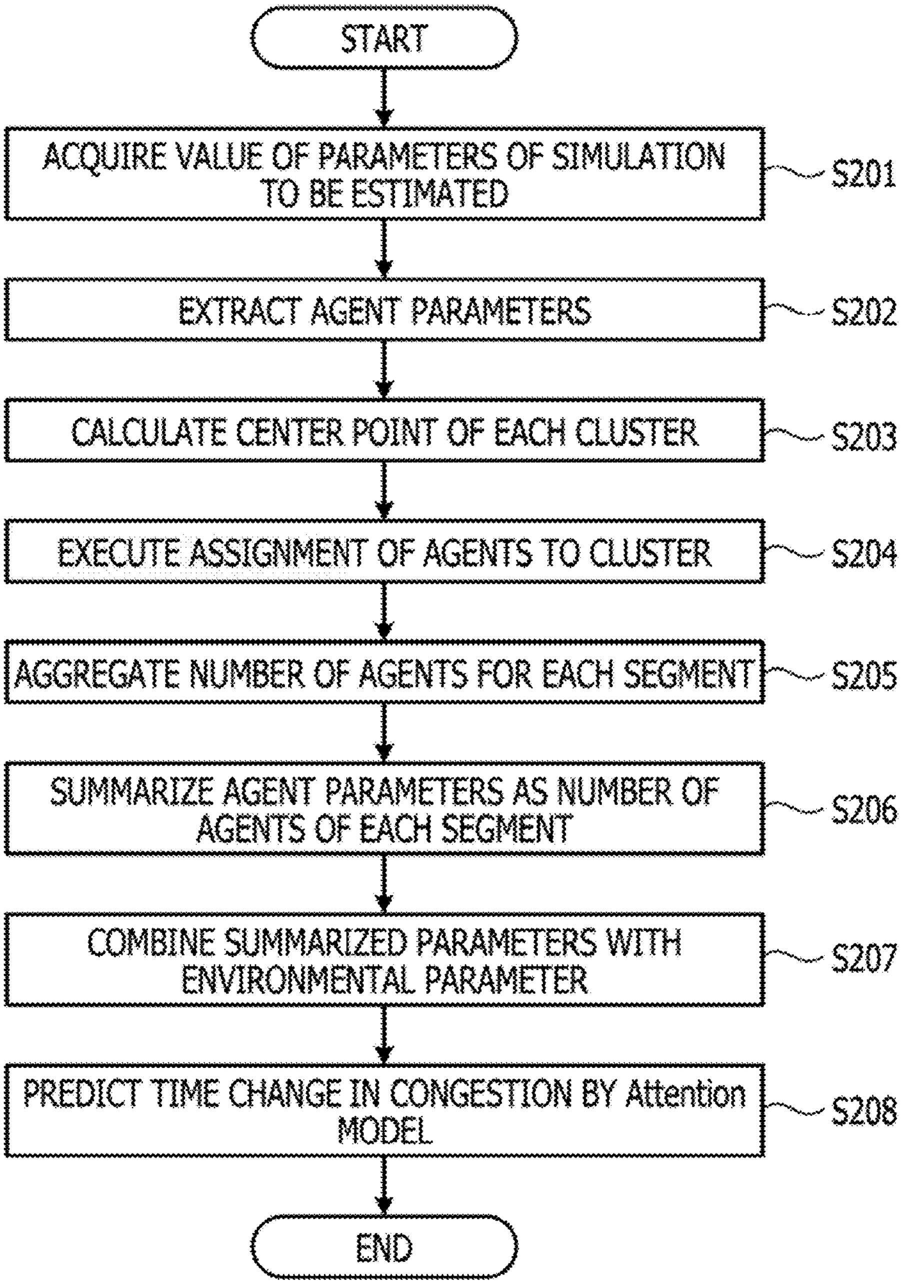
FIG. 8 is a flowchart of prediction processing for agent simulation by the estimation device according to the embodiment.

FIG. 8 is a flowchart of prediction processing for agent simulation by the estimation device according to the embodiment. Next, a flow of the prediction processing of the agent simulation by the estimation device 1 according to the embodiment will be described with reference to FIG. 8.

The estimation target parameter acquisition unit 21 acquires the values of the simulation parameters to be estimated (step S201).

Next, the estimation target parameter acquisition unit 21 extracts the agent parameters from the information of the simulation parameters to be estimated, using the model knowledge (step S202).

The estimation data generation unit 22 receives the information of the agent parameters included in the simulation parameters to be estimated from the estimation target parameter acquisition unit 21. Furthermore, the estimation data generation unit 22 receives input of cluster information from the classification unit 12 of the control unit 10. Then, the estimation data generation unit 22 calculates the center point of each cluster (step S203).

Next, the estimation data generation unit 22 calculates the distance between each agent and the center point, and assigns each agent to the nearest cluster (step S204).

Next, the estimation data generation unit 22 aggregates the number of agents for each segment corresponding to each cluster (step S205).

Then, the estimation data generation unit 22 summarizes the agent parameters as the segment parameter having the number of agents belonging to each segment as the value (step S206).

Next, the estimation data generation unit 22 combines the summarized agent parameters with the environmental parameter to generate information of the summary parameter of the simulation to be estimated (step S207).

The estimation execution unit 23 acquires the trained Attention model from the machine learning unit 13. Next, input of the information of the summary parameter of the simulation to be estimated is received from the estimation data generation unit 22. Then, the estimation execution unit 23 inputs the summarized parameter information into the Attention model, and predicts the time change inf congestion in the city to be estimated by the Attention model (step S208). Thereafter, the output unit 40 transmits the prediction result of the time change in congestion in the city to be estimated to the user terminal 2.

Figure 9:
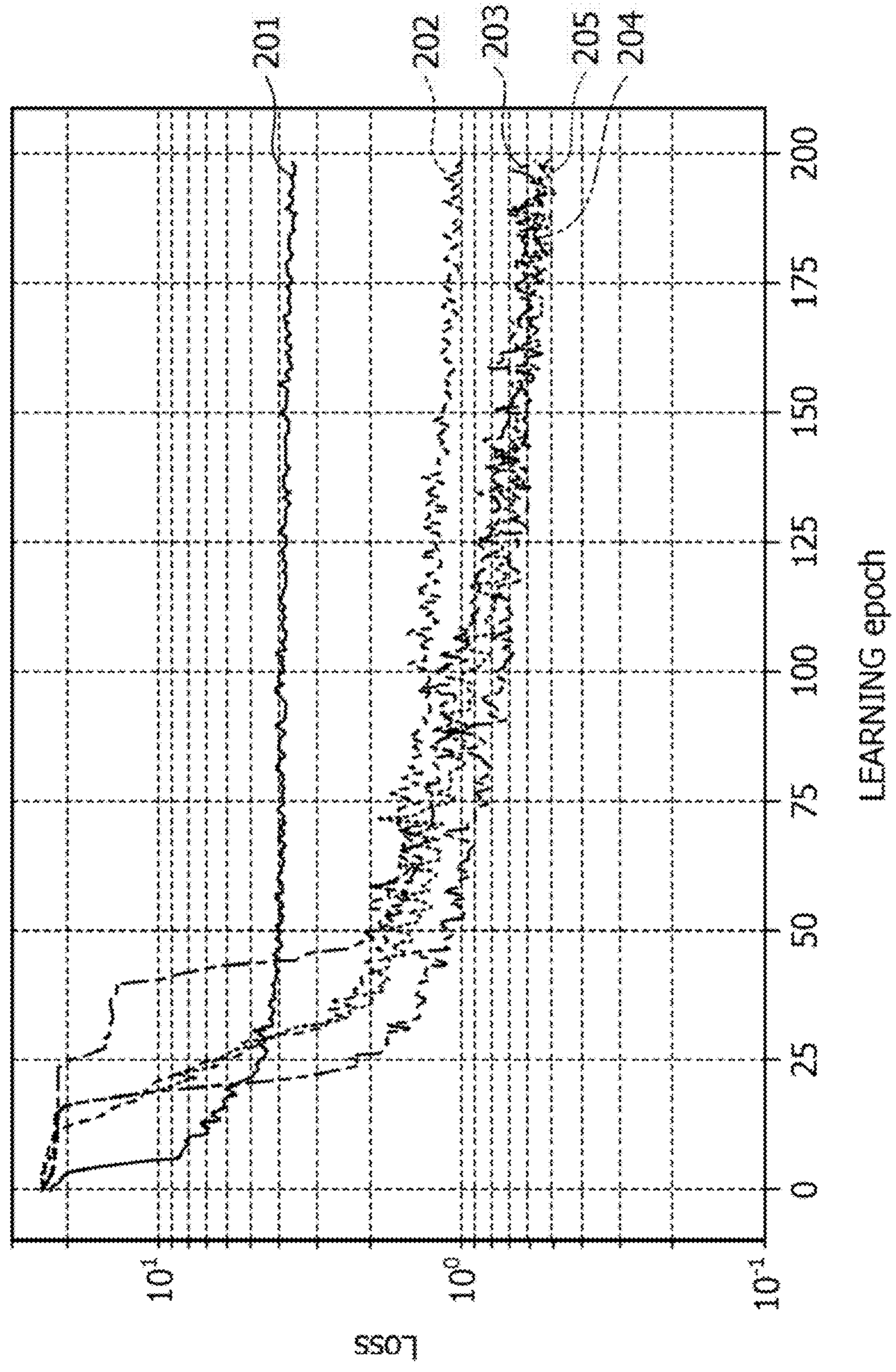
FIG. 9 is a diagram illustrating a comparison of prediction accuracy with a case of using another summarization method.

Here, effects of machine learning by the estimation device 1 according to the present embodiment will be described. First, as one method of training the surrogate model, a method of performing training without summarizing the simulation parameters is conceivable, but in that case, the machine learning may not proceed and there is a possibility of having a difficulty in obtaining an appropriate surrogate model. Therefore, it is desirable to summarize the simulation parameters and train the surrogate model. As the summarization method, some summarization methods other than the summarization method executed by the estimation device 1 according to the present embodiment are conceivable. FIG. 9 is a diagram illustrating a comparison of prediction accuracy with a case of using another summarization method. In FIG. 9, the vertical axis represents Loss and the horizontal axis represents learning epoch. Loss is a value representing the difference between the prediction result and the correct answer. It can be said that the smaller the Loss, the better the prediction accuracy.

The first summarization method is a method of inputting a part of the information of the simulation parameters. In this case, specifically, by inputting a series of first 150 steps and predicting the following steps, the prediction is performed using this first summarization method. In FIG. 9, the result of the first summarization method is represented by Graph 201. At the time of learning 200 epochs, the Loss of the first summarization method is 3.513 as illustrated in Graph 201. In the case of this method, the accuracy is poor because this method does not cover all the simulation parameters.

The second summarization method is a method of using parameters other than the agent parameters among the simulation parameters. In this case, parameters other than the agent parameters among the simulation parameters are input to the Attention model for training, and prediction is performed using the trained Attention model. In FIG. 9, the result of the second summarization method is represented by Graph 202. At the time of learning 200 epochs, the Loss of the second summarization method is 0.984 as illustrated in Graph 202. In the case of this method, since the environmental parameter representing the entire simulation is used, the accuracy is higher than that of the first summarization method, but the accuracy is not improved because all the simulation parameters are not covered.

The third summarization method is a method of estimating a latent variable of the agent parameter with an autoencoder. In this case, the Attention model is trained using the latent variable of the agent parameter estimated using the autoencoder as an input, and prediction is performed using the trained Attention model. In FIG. 9, the result of the third summarization method is illustrated in Graph 203. At the time of learning 200 epochs, the Loss of the third summarization method is 0.539 as illustrated in Graph 203. In the case of this method, the prediction accuracy is favorable because the parameters after summarization cover all the simulation parameters.

The fourth summarization method is a method of estimating a latent variable by a principal component analysis. In this case, the Attention model is trained using the latent variable estimated by the principal component analysis as an input, and prediction is performed using the trained Attention model. In FIG. 9, the result of the fourth summarization method is represented by Graph 204. At the time of learning 200 epochs, the Loss of the fourth summarization method is 0.520 as illustrated in Graph 204. In the case of this method, the prediction accuracy is favorable because the parameters after summarization cover all the simulation parameters.

Furthermore, Graph 205 in FIG. 9 represents the prediction result by the estimation device 1 according to the present embodiment. At the time of learning 200 epochs, the Loss of the prediction result in the case of using the estimation device 1 according to the present embodiment is 0.481, as illustrated in Graph 205. In the case of the estimation device 1 according to the present embodiment, the prediction accuracy is favorable because the summarized parameter represented by the number of agents included in the segment in which the agents are classified cover all the simulation parameters.

Figure 10:
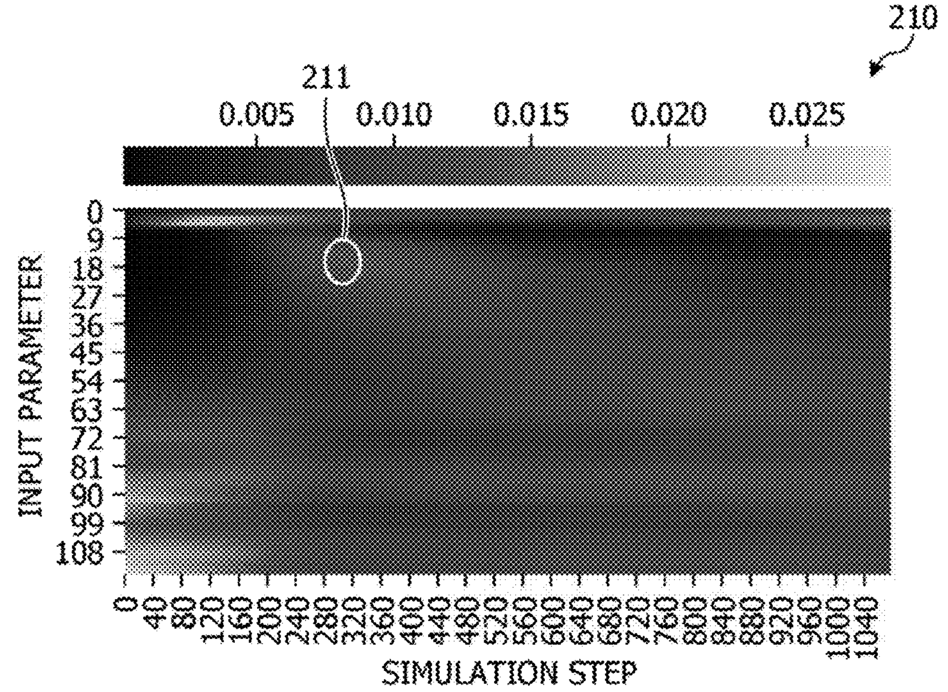
FIG. 10 is a diagram illustrating an example of a prediction result using an Attention model by the estimation device according to the embodiment.
Figure 10:
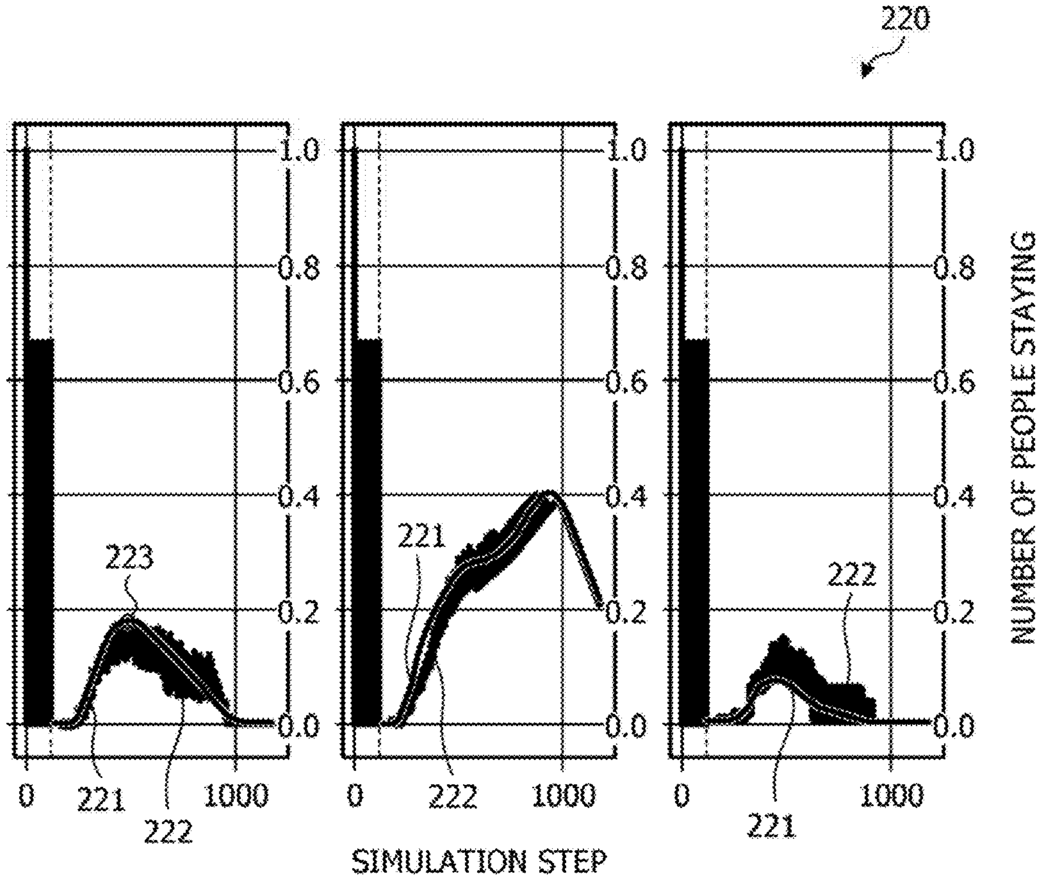

As described above, the accuracy of the prediction using the third summarization method, the prediction using the fourth summarization method, and the prediction by the estimation device 1 according to the present embodiment are all about the same. However, in the prediction by the estimation device 1 according to the present embodiment, the prediction is performed using an interpretable value, which is different from the cases using the other summarization methods. FIG. 10 is a diagram illustrating an example of the prediction result using the Attention model by the estimation device according to the embodiment.

Graph 210 illustrates the degree of contribution of each parameter to the prediction in each step. In Graph 210, the vertical axis represents an input parameter and the horizontal axis represents a simulation step. In Graph 210, the degree of contribution is represented by luminance. The higher the luminance, the higher the degree of contribution.

As illustrated in Graph 210, the Attention model can specify an input value that contributes to the prediction for each input parameter. That is, if the input value is an interpretable value, the validity of the prediction can be examined.

For example, it is assumed that prediction results illustrated in Graph 220 are obtained. Here, each graph of Graph 220 is a prediction result of the congestion situation at each node of the city to be estimated. In each graph of Graph 220, the vertical axis represents the number of people staying and the horizontal axis represents the simulation step. Then, in each graph of Graph 220, the solid line 221 represents the prediction result, and the gray region 222 represents the correct answer. In this case, it can be seen that the prediction result roughly represents the correct answer. However, the validity as to whether the prediction has been performed using appropriate information is an issue. Even if the prediction result is close to the correct answer, if the prediction is largely influenced by inappropriate information, the result may happen to be correct.

Therefore, the validity of the prediction is examined using the degree of contribution of Graph 210. For example, the congestion situation peaks at point 223 in Graph 220. In this case, the simulation step is approximately at the position of 300 steps. Then, in the graph 210, the degree of contribution of the parameters corresponding to the region 211 is large at the position where the simulation step is 300. Therefore, if it is interpretable what kind of parameter the parameter corresponding to the region 211 is, whether the parameter used for the prediction is correct can be determined, and the validity of the prediction can be determined.

In the estimation device 1 according to the present embodiment, the agents are clustered as a segment, and the simulation parameters are summarized using the number of agents included in the segment as a parameter. Therefore, it can be said that each parameter represents each segment, and each segment is information representing the characteristic of the agents belonging to the segment. Therefore, the parameter after summarization by the estimation device 1 according to the present embodiment can be interpreted. Therefore, the validity of the prediction by the estimation device 1 according to the present embodiment can be determined.

In contrast, in the case of using the autoencoder or the principal component analysis, it is difficult to interpret the input value because the parameters after summarization do not reflect the meaning of the parameters of the original simulation. Therefore, determination of the validity of the prediction is difficult in the prediction using the third summarization method or the fourth summarization method.

As described above, the estimation device 1 according to the present embodiment has a characteristic of being capable of determining the validity of the prediction, unlike the cases of using other summarization methods. Therefore, the estimation device 1 according to the present embodiment can determine whether appropriate prediction is being performed in the case of generating a simulation surrogate model and performing prediction, and can construct the surrogate model that appropriately substitutes for the simulation.

As described above, the estimation device according to the present embodiment creates the parameter that summarizes the agent simulation parameters, constructs the surrogate model of the agent simulation using the summarized parameter, and predicts the people flow and traffic flow. By reducing the number of parameters in this way, learning can reliably proceed, and it becomes possible to construct the surrogate model having high prediction accuracy. Furthermore, since the summarized parameter used by the estimation device according to the present embodiment has interpretable content, the validity of the prediction can be determined, and the appropriate surrogate model can be constructed and the appropriate prediction using the appropriate surrogate model can be performed.

Figure 11:
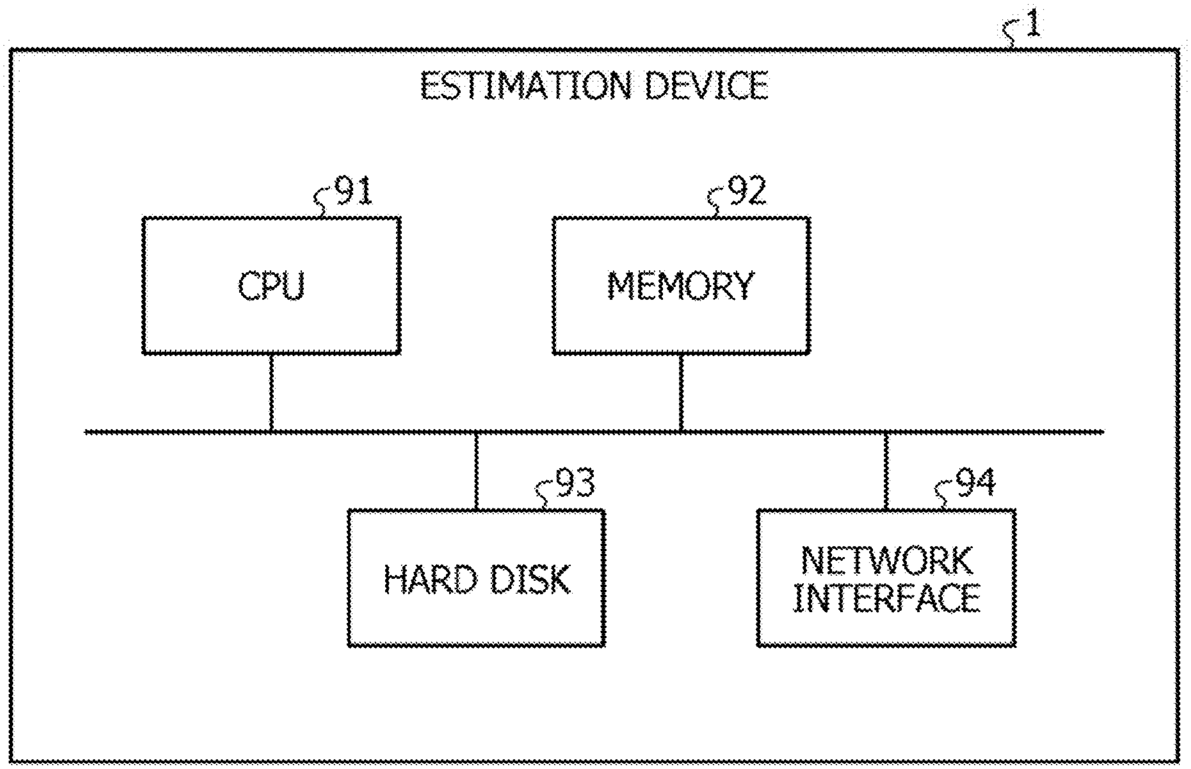
FIG. 11 is a diagram illustrating an example of a hardware configuration of the estimation device according to the embodiment.

FIG. 11 is a diagram illustrating an example of a hardware configuration of the estimation device according to the embodiment. Next, a hardware configuration that implements the estimation device 1 according to the present embodiment will be described with reference to FIG. 11.

The estimation device 1 includes, for example, as illustrated in FIG. 11, a CPU 91, a memory 92, a hard disk 93, and a network interface 94. The CPU 91 is connected to the memory 92, the hard disk 93, and the network interface 94 via a bus.

The network interface 94 is a communication interface between the estimation device 1 and an external device. For example, the network interface 94 relays communication between the CPU 91 and the user terminal 2.

The hard disk 93 is an auxiliary storage device. The hard disk 93 implements, for example, the function of the simulation information holding unit 30. Furthermore, the hard disk 93 may store the Attention model. Moreover, the hard disk 93 stores various programs including a machine learning program for implementing the functions of the control unit 10, the estimation unit 20, and the output unit 40 illustrated in FIG. 1.

For example, the machine learning program is stored in a DVD, which is an example of a recording medium that can be read by the estimation device 1, is read from the DVD, and is installed in the estimation device 1. Alternatively, the machine learning program is stored in a database or the like of another computer system connected via the network interface 94 and is read from the database or the like and is installed to the estimation device 1. Then, the installed machine learning program is stored in the hard disk 93, read to the memory 92, and executed by the CPU 91.

The CPU 91 implements the functions of the control unit 10, the estimation unit 20, and the output unit 40 illustrated in FIG. 1 by reading the various programs from the hard disk 93, expanding the programs on the memory 92, and executing the programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a machine learning program of training a surrogate model of an agent simulation, the machine learning program comprising instructions for causing a computer to execute processing comprising:

acquiring a first parameter that represents an environment and respective second parameters each of which represents a movement attribute of a corresponding moving body among a plurality of moving bodies in the environment;

classifying the plurality of moving bodies into a plurality of groups by performing a clustering process on the plurality of moving bodies based on similarity among the respective second parameters;

generating, for each group of the plurality of groups, a third parameter by counting the number of moving bodies classified into the each group, the third parameter of the each group indicating the counted number; and training the surrogate model by inputting, as training data of the surrogate model, the first parameter and respective third parameters generated for the plurality of groups to the surrogate model to cause the surrogate model to generate estimation information regarding movement of the plurality of moving bodies in the environment.

2. The non-transitory computer-readable recording medium according to claim 1, wherein each of the respective second parameters is information related to movement of an entity that independently makes a decision in the environment.

3. The non-transitory computer-readable recording medium according to claim 1, wherein the plurality of moving bodies is classified into the plurality of groups by performing the clustering process, so that moving bodies having high similarity among the respective second parameters belong to the same group of the plurality of groups.

4. The non-transitory computer-readable recording medium according to claim 1, wherein the training includes updating parameters of the surrogate model the machine learning model using the generated estimation information and a result of simulation performed using the first parameter and the second parameter.

5. The non-transitory computer-readable recording medium according to claim 4, the processing further comprising:

obtaining information of a fourth parameter that represents a second environment and respective fifth parameters each of which represents a movement attribute of a corresponding second moving body among a plurality of second moving bodies in the second environment;

classifying the plurality of second moving bodies into a plurality of second groups by performing the clustering process on the plurality of second moving bodies based on similarity among the respective fifth parameters;

generating, for each second group of the plurality of second groups, a sixth parameter by counting the number of the second moving bodies classified into the each second group, the six parameter of the each second group indicating the counted number of the second moving bodies classified into the each second group; and inputting the fourth parameter and respective six parameters generated for the plurality of second groups in the second environment to the trained surrogate model to generate estimation information regarding movement of the plurality of second moving bodies in the second environment.

6. A machine learning method implemented by a computer of training a surrogate model of an agent simulation, the machine learning method comprising:

acquiring, by a computer, a first parameter that represents an environment and respective second parameters each of which represents a movement attribute of a corresponding moving body among a plurality of moving bodies in the environment;

classifying the plurality of moving bodies into a plurality of groups by performing a clustering process on the plurality of moving bodies based on similarity among the respective second parameters;

generating, for each group of the plurality of groups, a third parameter by counting the number of moving bodies classified into the each group, the third parameter of the each group indicating the counted number; and training the surrogate model by inputting, as training data of the surrogate model, the first parameter and respective third parameters generated for the plurality of groups to the surrogate model to cause the surrogate model to generate estimation information regarding movement of the plurality of moving bodies in the environment.

7. An information processing device of training a surrogate model of an agent simulation, the information processing devices comprising:

a memory; and a processor coupled to the memory and configured to:

acquire a first parameter that represents an environment and respective second parameters each of which represents a movement attribute of a corresponding moving body among a plurality of moving bodies in the environment;

classify the plurality of moving bodies into a plurality of groups by performing a clustering process on the plurality of moving bodies based on similarity among the respective second parameters;

generate, for each group of the plurality of groups, a third parameter by counting the number of moving bodies classified into the each group, the third parameter of the each group indicating the counted number; and train the surrogate model by inputting, as training data of the surrogate model, the first parameter and respective third parameters generated for the plurality of groups to the surrogate model to cause the surrogate model to generate estimation information regarding movement of the plurality of moving bodies in the environment.

* * * * *